(12) United States Patent
Shirai

(10) Patent No.: US 8,488,148 B2
(45) Date of Patent: Jul. 16, 2013

(54) PRINTING SYSTEM FOR NOTIFYING DATA PROCESSING APPARATUS OF INFORMATION REGARDING A LOCATION OF PRINTING APPARATUS

(75) Inventor: Kenichi Shirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 885 days.

(21) Appl. No.: 11/951,881

(22) Filed: Dec. 6, 2007

(65) Prior Publication Data

US 2008/0151292 A1 Jun. 26, 2008

(30) Foreign Application Priority Data

Dec. 21, 2006 (JP) ................................. 2006-344393

(51) Int. Cl.
*G06F 3/12* (2006.01)
(52) U.S. Cl.
USPC ........................................ 358/1.15; 358/1.14
(58) Field of Classification Search
USPC .............................................. 358/1.14, 1.15
See application file for complete search history.

(56) References Cited

U.S. PATENT DOCUMENTS

| | | | | |
|---|---|---|---|---|
| 6,452,692 B1 * | 9/2002 | Yacoub | .......................... | 358/1.15 |
| 6,470,387 B1 * | 10/2002 | Fischer | .......................... | 709/224 |
| 6,552,813 B2 * | 4/2003 | Yacoub | .......................... | 358/1.1 |
| 7,640,288 B2 * | 12/2009 | Yao et al. | ....................... | 709/200 |
| 2006/0122848 A1 * | 6/2006 | Takagi | ............................... | 705/1 |
| 2006/0221379 A1 * | 10/2006 | Noda | ........................... | 358/1.14 |
| 2007/0245358 A1 * | 10/2007 | Hattori et al. | .................. | 719/321 |

FOREIGN PATENT DOCUMENTS

| | | |
|---|---|---|
| JP | 06-242900 A | 9/1994 |
| JP | 2002-063007 A | 2/2002 |
| JP | 2002-63007 A | 2/2002 |
| JP | 2004-021646 A | 1/2004 |
| WO | 03/107171 A | 12/2003 |
| WO | 03/107171 A1 | 12/2003 |

OTHER PUBLICATIONS

Machine translation for JP 2004-021646, IDS.*

* cited by examiner

*Primary Examiner* — Qian Yang

(74) *Attorney, Agent, or Firm* — Canon USA, Inc., I.P. Division

(57) ABSTRACT

A printing system includes a data processing apparatus and a printing apparatus. When a user issues an instruction for performing a print job to the printing apparatus via the data processing apparatus to perform the print job with the printing apparatus, if it is determined that an installation location of the data processing apparatus or the printing apparatus has been changed from a previous print job, the data processing apparatus or the printing apparatus notifies the user of the change in the print environment.

6 Claims, 13 Drawing Sheets

PRINTING SYSTEM FOR NOTIFYING DATA PROCESSING APPARATUS OF INFORMATION REGARDING A LOCATION OF PRINTING APPARATUS

BACKGROUND OF THE INVENTION

1. Field of the Invention

The present invention relates to a printing system configured to perform data processing. More specifically, the present invention relates to a printing system including a printing apparatus configured to perform data processing wherein the printing system is configured to perform print processing based on a print request from a data processing apparatus.

2. Description of the Related Art

In recent years, a printer and a multifunction peripheral (MFP) have been used in a network-connected environment. Under such a network-connected environment, users generally use one printer from a plurality of host computers. In such a case where a plurality of users use one printer, if a print environment of the shared printer has been changed, a user who has not known the change of the print environment may not obtain a desired print product.

That is, in the case where a two-sided print function of a shared printer is removed, for example, if a user who has not been informed of the change in the print function, generates an instruction for performing a two-sided print operation with the printer that no longer has a two-sided print function, the instructed print operation can not be performed.

In this regard, Japanese Patent Application Laid-Open No. 2002-63007 discusses a method for searching for a printer designated by a user and notifying the user of a change in a print environment of a retrieved printer if the print environment of the printer has been changed from a previously stored one. The user is informed of the change at the time of generating an instruction for performing a print operation.

In the method discussed by Japanese Patent Application Laid-Open No. 2002-63007, a user can be informed of a change in a function of a printer, however, a user is not informed of a change in a print environment in the case where an installation location of a printer has been changed.

That is, the above-described conventional method does not allow a user to be aware of a change in a print environment if an installation location of the printer has been changed but a print operation (function) has not been changed.

Accordingly, in the above-described conventional method, when an installation location of a shared printer on a network is changed, a user who desires to perform a print operation is not informed of the change in the installation location of the printer. Thus, a print product of a document that the user has instructed to print can be output in a location where the user does not expect, which degrades a user's convenience and data security.

SUMMARY OF THE INVENTION

The present invention is directed to a printing system configured to notify a user, before starting a print operation, that the user is about to perform printing with a printing apparatus that is installed in a location where the user does not expect.

According to an aspect of the present invention, a printing apparatus includes a receiving unit configured to receive a print request and installation location information, wherein the installation location is associated with the data processing apparatus, a storage unit configured to store the installation location information, a determination unit configured to determine whether the installation location information received by the receiving unit is different from installation location information previously stored in the storage unit, and a notification unit configured to notify the data processing apparatus of information including a determination made by the determination unit if it is determined by the determination unit that the installation location information received by the receiving unit is different from the installation location information previously stored in the storage unit.

According to an aspect of the present invention, a method for processing data in a printing system which includes a printing apparatus and a data processing apparatus includes receiving a print request and installation location information, wherein the installation location is associated with the data processing apparatus, storing the installation location information, determining whether the received installation location information is different from installation location information previously stored, and notifying the data processing apparatus of information based on the determination if it is determined that the received installation location information is different from the previously stored installation location information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
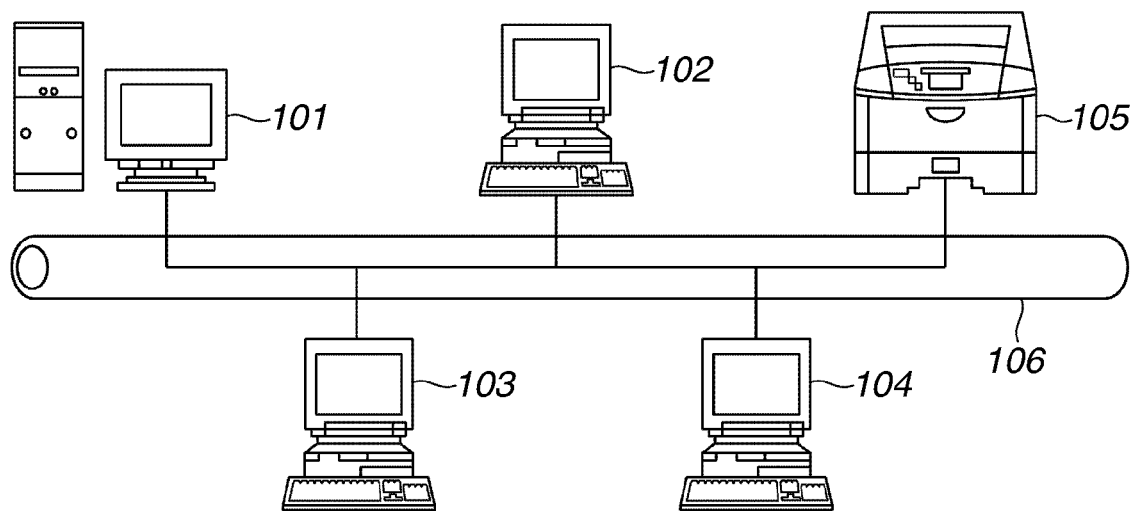
FIG. 1 illustrates an example of a configuration of a printing system to which a printing apparatus according to a first exemplary embodiment of the present invention can be applied.

Now, a first exemplary embodiment of the present invention will be described. FIG. 1 illustrates an example of a configuration of a printing system to which a printing apparatus according to a first exemplary embodiment of the present invention can be applied.

Referring to FIG. 1, computers 101, 102, 103, and 104 are respectively connected to a network 106. Thus, the computers 101, 102, 103, and 104 are in communication with one another via the network 106. Each of the computers 101, 102, 103, and 104 is typically a personal computer (PC).

The PCs 101, 102, 103, and 104 include input devices such as a keyboard (not illustrated) and a pointing device (not illustrated) and an output device such as a display unit.

In addition, the PCs 101, 102, 103, and 104 include a network controller (not illustrated) for controlling data communication among the PCs 101, 102, 103, and 104 via the network 106, based on a predetermined protocol. Among the PCs 101, 102, 103, and 104, the PCs 102, 103, and 104 can primarily serve as a client computer (hereinafter referred to as a "client").

The clients 102 through 104 are connected to the network 106 via a network cable or wirelessly.

Furthermore, the clients 102 through 104 can execute various programs such as an application program. In addition, each of the clients 102 through 104 includes a printer driver having a function for converting print data into data based on a printer language that corresponds to a function of a printer. Each of the clients 102 through 104 can include a plurality of printer drivers.

The PC 101 functions as a server computer (hereinafter referred to as a "server"). The server 101 is connected to the network 106 via a network cable. The server 101 stores a file used on the network environment and monitors a state of the network 106.

The server 101 can also function as a print server connected to the network 106.

More specifically, the server 101 includes a function for temporarily storing a print job. The print job includes print data generated based on a print request made by a user via the clients 102 through 104. The server 101 causes the printer device 105 to perform a print operation based on the stored print job.

In addition, the server 101 can also receive print job information that does not include print data from the clients 102 through 104, and manage a printing order. In this case, the server 101 notifies permission for sending a print job including print data to a client (the clients 102 through 104) when the client is to take its turn for printing data according to the printing order.

Then, the server 101 receives a print job from the client and causes the printer device 105 to perform printing of the received job.

In addition, the server 101 includes a function for receiving status information about the printer device 105 and various information about the print job and sending the received information to the clients 102 through 104.

The printer device 105 can perform printing of the print job received from the server 101 or the print job directly received from a client. The printer device 105 is connected to the network 106 via a network interface.

The printer device 105 analyzes the print job including print data which is sent from the clients 102 through 104, converts the print data into a dot image per page, and stores the converted dot image (image data) on a memory such as a random access memory (RAM).

Furthermore, the printer device 105 outputs the dot image stored on the memory at timing synchronous with the print processing performed by the printer engine. Thus, the printer device 105 prints the dot image on a print paper. It should be noted that an image data converting process or a compressing process per band can also be performed when the dot image is expanded, depending on capacity of RAM.

The printer device 105 includes a central processing unit (CPU), a read-only memory (ROM), a RAM, and a hard disk drive (HDD). The printer device 105 can perform various processing by reading and executing with the CPU a control program stored on the ROM or the HDD which is loaded onto the RAM.

In the example illustrated in FIG. 1, only one printer device 105 is included in the printing system. However, the printing system according to the present embodiment can include a plurality of other printer devices that can be connected to the network 106 to communicate with the server 101 and the PCs 102 through 104. In this case, each of the printer devices can have different functions. Furthermore, each of the printer devices can have a different print speed (throughput).

Figure 2:
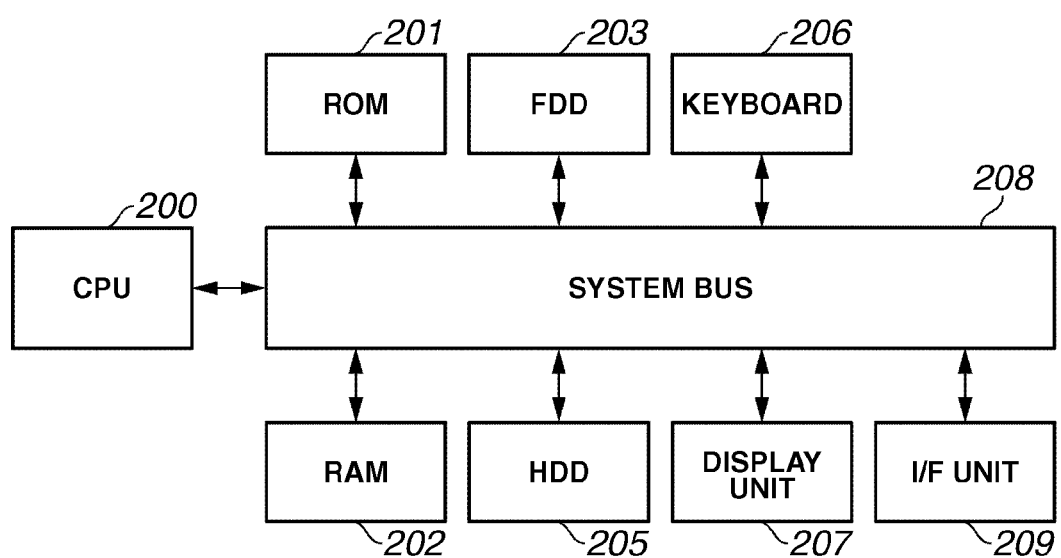
FIG. 2 illustrates an example of a configuration of a computer used as a client apparatus (FIG. 1) or a server apparatus (FIG. 1), according to the first exemplary embodiment of the present invention.

FIG. 2 illustrates an example of a configuration of the PC (the server 101 (FIG. 1)) and the clients 102 through 104 (FIG. 1)) according to the present embodiment. In the present embodiment, the server 101 and the clients 102 through 104 have the same or similar hardware configuration. However, the hardware configuration of the server 101 and the clients 102 through 104 can be different from one another.

Referring to FIG. 2, the PC (the server 101 and the clients 102 through 104) includes a CPU 200, a ROM 201, a RAM 202, a floppy disk drive (FDD) 203, an HDD 205, a keyboard 206, a display unit 207, and an interface (I/F) unit 209, which are in communication with one another via a system bus 208.

The CPU 200 performs control of the entire PC. The CPU 200 performs control to transfer drawing information generated by executing various programs to the printer driver.

The HDD 205 stores an application program, a printer driver program, and an operating system (OS).

The CPU 200 performs control for temporarily storing on the RAM 202 information necessary for executing a program and a file.

The ROM 201 stores a program such as a basic input/output (I/O) program (system boot program) and various data such as font data used in processing a document and data for a template.

The RAM 202 serves as a main memory and a work area for the CPU 200. A program stored on a floppy disk (FD) (not illustrated) can be loaded on the PC via the FDD 203, which will be described below in FIG. 5.

The FD is a computer-readable storage medium storing a program. The present invention is not limited to the use of an FD as the storage medium. That is, a compact disc-read only memory (CD-ROM), a CD-recordable (CD-R), a CD-rewritable (CD-RW), a PC card, a digital versatile disk (DVD), an integrated circuit (IC) memory card, a magneto-optical disk (MO), or a memory stick can also be used as the storage medium.

The HDD 205 is a mass storage device storing an application program, a printer driver program, an OS, a network printer control program, and various related programs. In addition, the HDD 205 holds a spooler for temporarily storing print information to be transferred to the server 101.

With respect to the server 101, the HDD 205 of the server 101 stores information about a print job corresponding to a print request from the clients 102 through 104, and a table for controlling an order of performing print jobs based on the print job information.

The keyboard 206 is an input device that can be operated by a user to enter a device control command for controlling the server 101 or the clients 102 through 104. The input device can include a pointing device such as a mouse, in addition to the keyboard 206. The user can use the pointing device to click an icon or buttons on a user interface (UI) screen of the display 207 to selectively execute a command.

The display unit 207 displays the command entered by a user via the keyboard 206 and information about a capacity of the printer device 105.

The system bus 208 connects each component of the PC with one another. The PC can perform data communication with an external apparatus connected to the PC via the I/F unit 209. The I/F unit 209 includes a network interface card (NIC). Thus, the PCs 101 through 104 can perform data communication with a network device on the network 106 according to a predetermined protocol.

The present invention is not limited to the above-described hardware configuration of the PC (the PCs 101 through 104) in FIG. 2. For example data and a program can be stored on the ROM 201, the RAM 202, or the HDD 205, depending on a characteristic of the data or the program.

Figure 3:
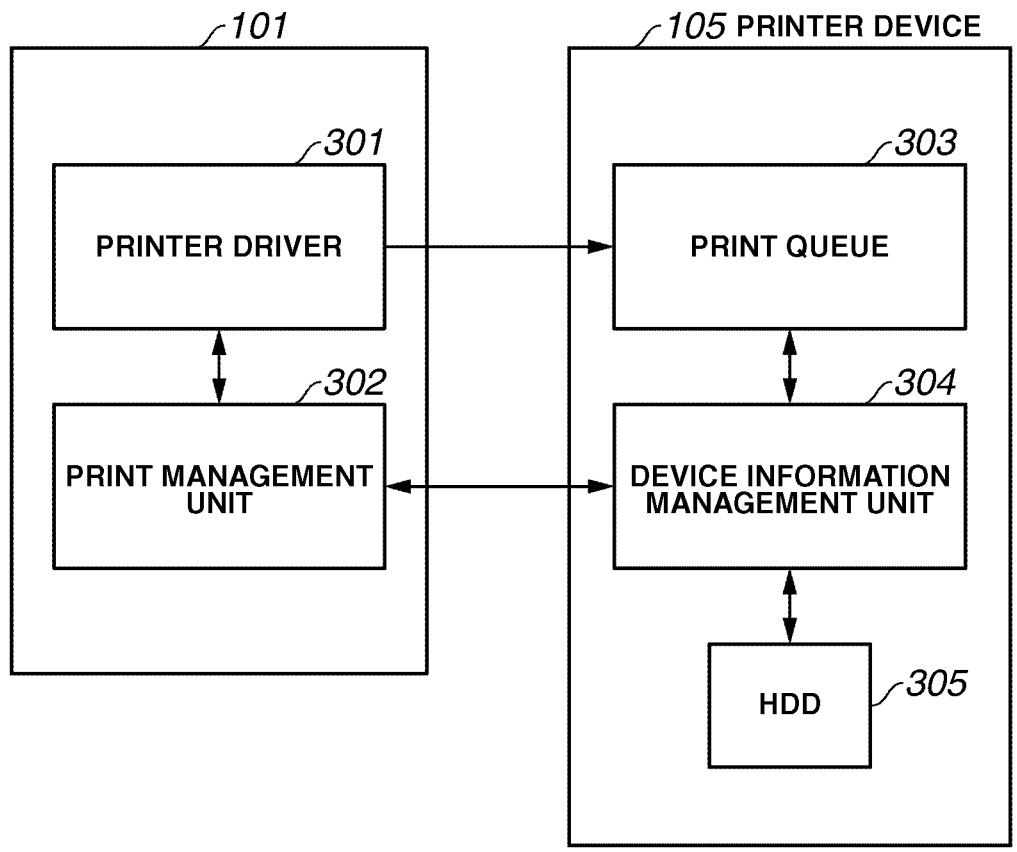
FIG. 3 illustrates an example of a hardware configuration of the PC (FIG. 1) and the printer device (FIG. 1) which send or receive information between them, according to the first exemplary embodiment of the present invention.

FIG. 3 illustrates an additional example of a hardware configuration of the PCs 101 through 104 and the printer device 105 according to the present exemplary embodiment. For discussion purposes, FIG. 3 only references PC 101.

Referring to FIG. 3, the PC 101 includes a printer driver 301 and a print management unit 302. The printer device 105 includes a print queue 303, a device information management unit 304, and an HDD 305.

When a user issues an instruction for performing a print operation using an application program, the application program generates an instruction for generating a series of drawing commands to the OS. The printer driver 301 converts the generated drawing commands into a predetermined format. Then, the printer driver 301 sends the converted drawing command to a spooler of the OS.

The spooler of the OS sends print job data via a port of the printer device 105 which the user selects through the user interface of the printer driver 301, and via which the user gives an instruction for printing. Thus, the print job is sent to the selected printer device 105.

The printer driver 301 includes a function for sending job information to the print management unit 302, in addition to a function for generating a job.

The print management unit 302 manages information about the clients 102 through 104. The print management unit 302 acquires information about the clients 102 through 104 from the printer driver 301. In addition, the print management unit 302 sends and receives information to and from the device information management unit 304. The print management unit 302 can be constituted by software.

The print queue 303 arranges an order of processing jobs sent from the printer driver 301. The print queue 303 is provided on the RAM of the printer device 105.

The device information management unit 304 of the printer device 105 communicates with the PC 101 via the print management unit 302 to acquire and manage information about an installation location and state of the printer device 105. In addition, the device information management unit 304 manages a list of clients 502 (FIG. 5), which is information about the client via which the user has generated the instruction for printing. The device information management unit 304 is implemented by software provided on the RAM of the printer device 105.

Figure 5:
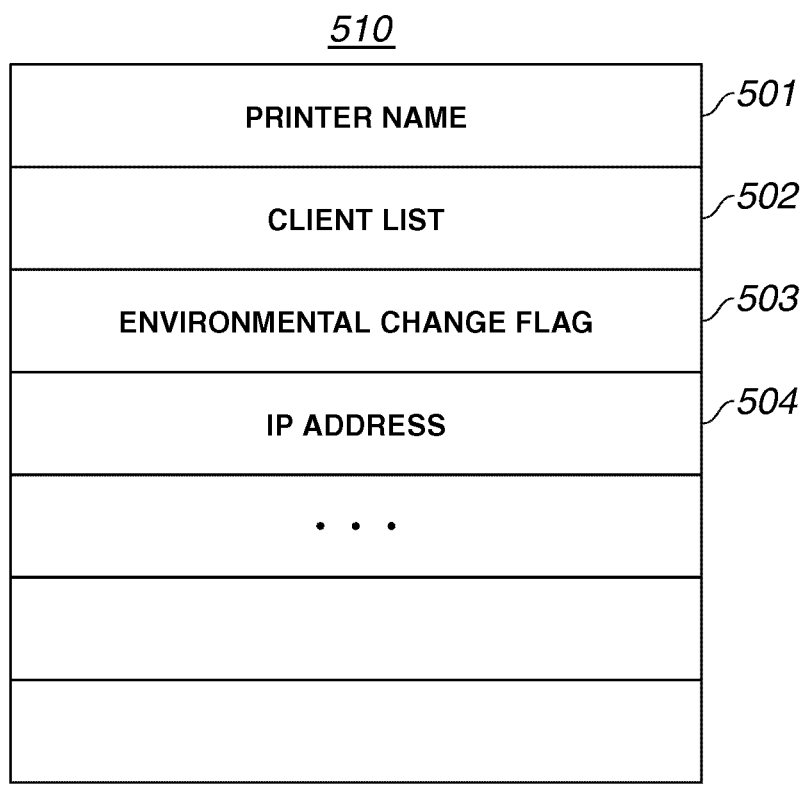
FIG. 5 illustrates an example of a memory map of printer information managed by the printer device (FIG. 1), according to the first exemplary embodiment of the present invention.

The HDD 305 of the printer device 105 stores the client list 502 and other information about the clients listed in the client list 502 (FIG. 5).

In the printing system including the server 101 and the printer device 105 having the above-described configuration, a positional relationship between the PC 101 and the printer device 105 can be changed from a previous printing operation because of a change in the printing system, a seat change of the user, or other reasons.

The PC 101 can be installed in a location more distant from the printer device 105 than the previous installation location, or can be installed in a location that the user does not keep in mind. In this case, a user's convenience in retrieving a print product is degraded. Furthermore, an output print product can be left un-retrieved in the printer device 105, which degrades the data security.

In particular, if the location of the PC 101 or the printer device 105 has been changed, the user who generates a print instruction does not always know about the new location of the PC 101 or the printer device 105. That is, even if the PC or printer location is changed, as long as the client (each of the clients 102 through 104) and the PC 101 or the printer device 105 communicates with each other, the instructed print operation can be performed.

According to the present embodiment, in the case where a user generates a request for printing from the PC 101, if the installation location of the designated printer device 105 or the PC 101 has been changed from a previous print operation, the user is notified of the location change before starting a print job.

Accordingly, if the location of the PC 101 or the printer device 105 has been changed, the user can recognize that the printer device 105 is now installed in an inappropriate location instead of the previous appropriate location, in terms of a positional relationship.

Figure 4:
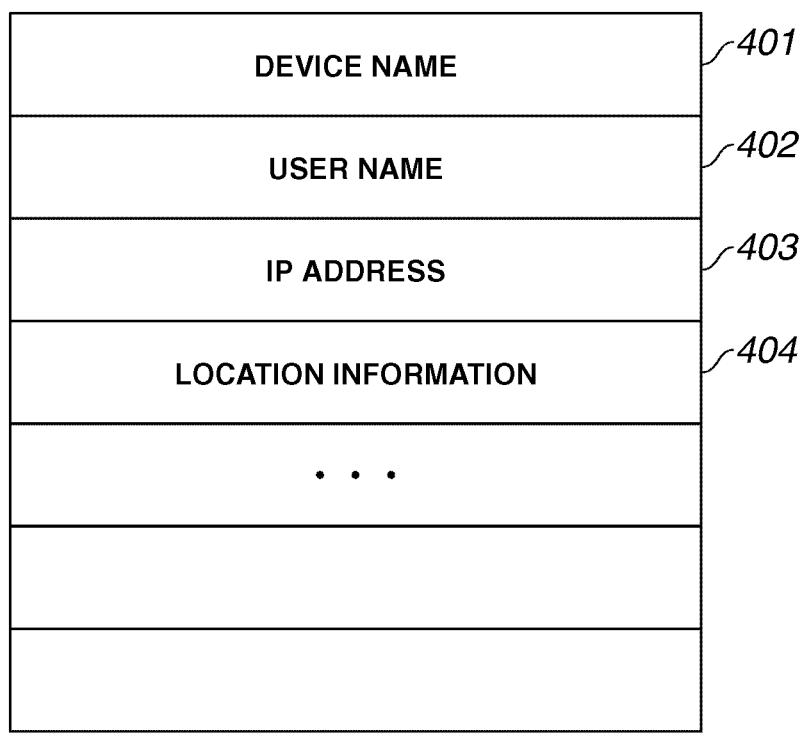
FIG. 4 illustrates an example of a memory map of host information managed by the PCs (FIG. 3) according to the first exemplary embodiment of the present invention.

FIG. 4 illustrates an example of a memory map of client information 410 managed by the print management unit 302 of the PC 101 (FIG. 3) according to the present embodiment.

Referring to FIG. 4, the client information 410 includes a device name 401, a user name 402, an Internet protocol (IP) address 403, and installation location information 404.

The user name 402 indicates a name of the user who has generated the instruction for performing the print job. The installation location information 404 indicates an approximate installation location of the PC 101.

The installation location information 404 can be, for example, a room or a floor of the room in which the PC 101 is installed. Alternatively, the installation location information can be a longitude and a latitude of the location of the PC 101.

In the present embodiment, the installation location (installation environment) of the PC 101 can be identified based on the installation location information. The installation location information can be updated by a user every time the installation location of the PC 101 is changed. Alternatively, the installation location information can be automatically updated based on information externally acquired.

FIG. 5 illustrates an example of a memory map of printer information 510 managed by the device information management unit 304 of the PC 101 (FIG. 3) according to the present embodiment.

Referring to FIG. 5, the printer information 510 includes a device name 501, a client list 502, an environmental change flag 503, and an IP address 504.

The device name 501 indicates a name of the printer device 105. The client list 502 includes information about the PCs via which a user has once generated an instruction for performing a print operation with the printer device 105. The client list 502 is described below.

The environmental change flag 503 is set "On" when the setting for the print environment of the printer device 105 is changed by an administrator or a user of the printer device 105. That is, the environmental change flag 503 is used to change environment setting for a subsequent print job and beyond.

The IP address 504 indicates an IP address of the printer device 105. In addition, the IP address 504 can indicate positional information (installation location information) of the printer device 105.

Figure 6:
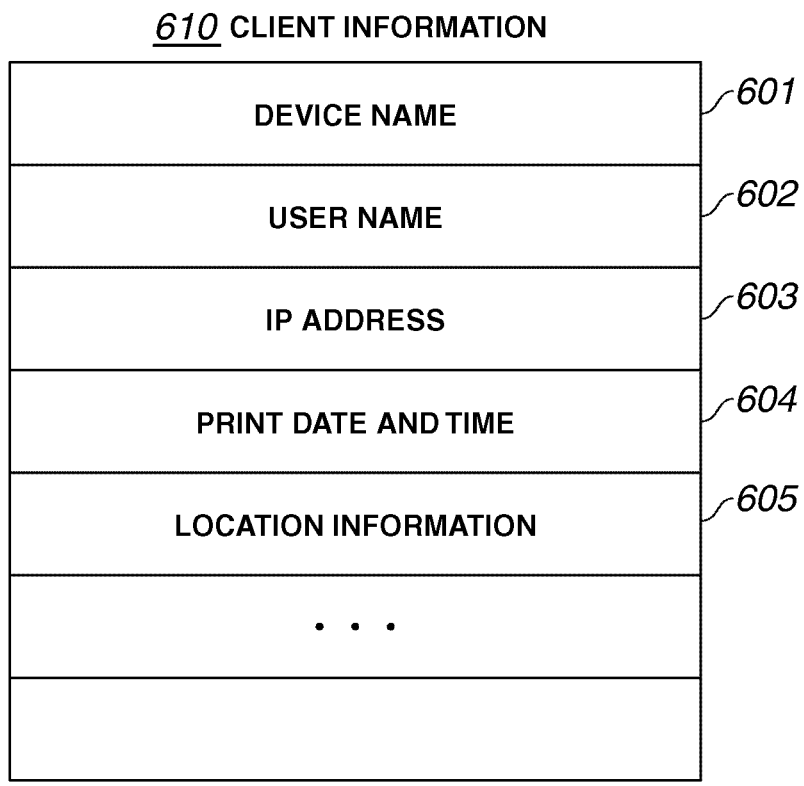
FIG. 6 illustrates an example of a memory map of detailed client information included in a client list according to the first exemplary embodiment of the present invention.

FIG. 6 illustrates an example of a memory map of detailed information 610 about the client (the PC 101) included in the client list 502 (FIG. 5) according to the present embodiment.

Referring to FIG. 6, the detailed client information 610 includes a device name 601, a user name 602, an IP address 603, a print date and time 604, and installation location information 605.

The device name 601 indicates a name of the PC via which the user has generated an instruction for performing a print job. The user name 602 indicates a name of the user who has generated the instruction for performing the print job. The IP address 603 indicates an IP address of the PC via which the user who has generated the instruction for performing a print job. The print date and time 604 indicates when the print job is performed and completed with the printer device 105 based on the user instruction. The installation location information 605 indicates installation location about the PC via which the user has generated the instruction for performing a print job.

Figure 7:
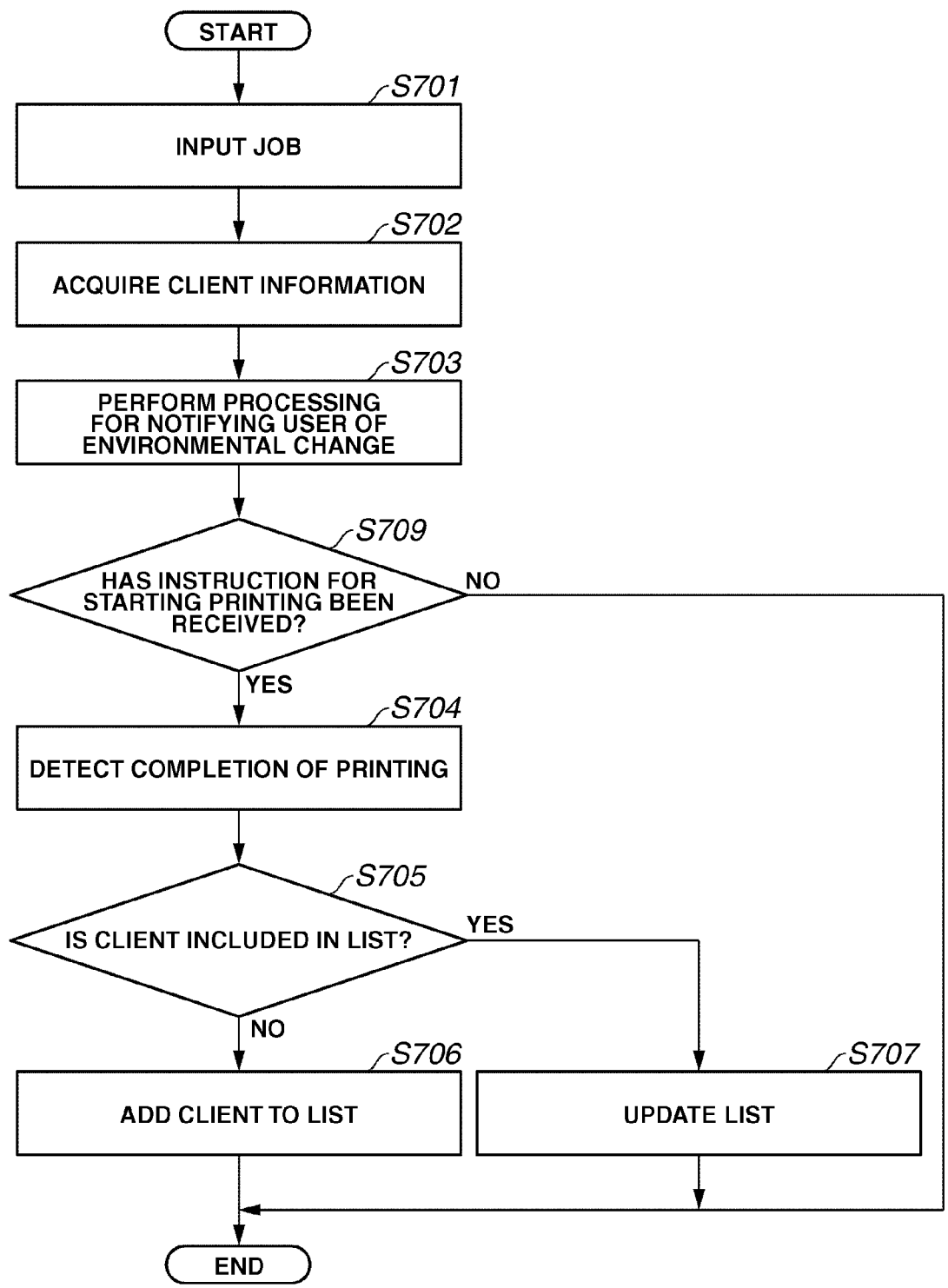
FIG. 7 is a flow chart illustrating an example of data processing performed by the printer device according to the first exemplary embodiment of the present invention.

FIG. 7 is a flow chart illustrating an example of data processing performed by the printer device 105 according to the present embodiment. According to the processing flow in FIG. 7, the printer device 105 stores information about the PC via which the user has generated the instruction for performing a print job. Each step of the flow chart of FIG. 7 can be implemented by reading and executing a control program stored on a ROM and loaded onto a RAM of a controller unit of the printer device 105 (FIG. 1), with a CPU of the controller unit.

Referring to FIG. 7, in step S701, the printer device 105 receives a print job from the PC 101 via the network 106. The printer device 105 stores the received print job in a buffer area on the RAM of the controller unit of the printer device 105.

In step S702, the device information management unit 304 (FIG. 3) acquires the client information 410 (FIG. 4) about the PC 101 to which the user has input a print job from the print management unit 302 of the PC 101.

In step S703, the device information management unit 304 determines whether the information corresponding to the acquired client information 410 (FIG. 4) is included in the client list 502 (FIG. 5).

If it is determined in step S703 that the information corresponding to the acquired client information 410 is included in the client list 502 (YES in step S703), then the CPU of the controller unit of the printer device 105 compares the installation location information 404 included in the client information 410 which is acquired in step S702, with the installation location information about the PC 101 included in the client list 502 which is previously stored on the HDD 305. If it is determined that the installation location information 404 is different from the installation location information about the PC 101 included in the client list 502, then the CPU of the controller unit of the printer device 105 performs processing for notifying the user of an environmental change. The environmental change notification processing is described below with reference to FIG. 8.

After having performed the environmental change notification processing, in step S709, the printer device 105 determines whether a print job start instruction has been received from the PC 101. If it is determined in step S709 that a print job start instruction has been received from the PC 101 (YES in step S709), then the instructed print job is performed.

When the printing of the print job is completed, in step S704, the device information management unit 304 of the printer device 105 determines that the print job has been completed. Then, the processing advances to step S705.

In step S705, the device information management unit 304 of the printer device 105 compares the client information 410 acquired in step S702, with the detailed client information 610 about the client (the PC 101), via which the user has generated the instruction for performing the current print operation, and determines whether the detailed client information 610 about the client is included in the client list 502.

If it is determined in step S705 that the client (the PC 101) is not included in the client list 502 (FIG. 5) (NO in step S705), then the processing advances to step S706.

In step S706, the printer device 105 adds the detailed client information 610 about the client (the PC 101) that has been determined not to be included in the client list 502 (FIG. 5) to the client list 502. Then, the processing ends.

On the other hand, if it is determined in step S705 that the client (the PC 101) is included in the client list 502 (FIG. 5) (YES in step S705), then the processing advances to step S707. In step S707, the printer device 105 updates the detailed client information 610 about the client (the PC 101) included in the client list 502 (FIG. 5). Then the processing ends.

Figure 8:
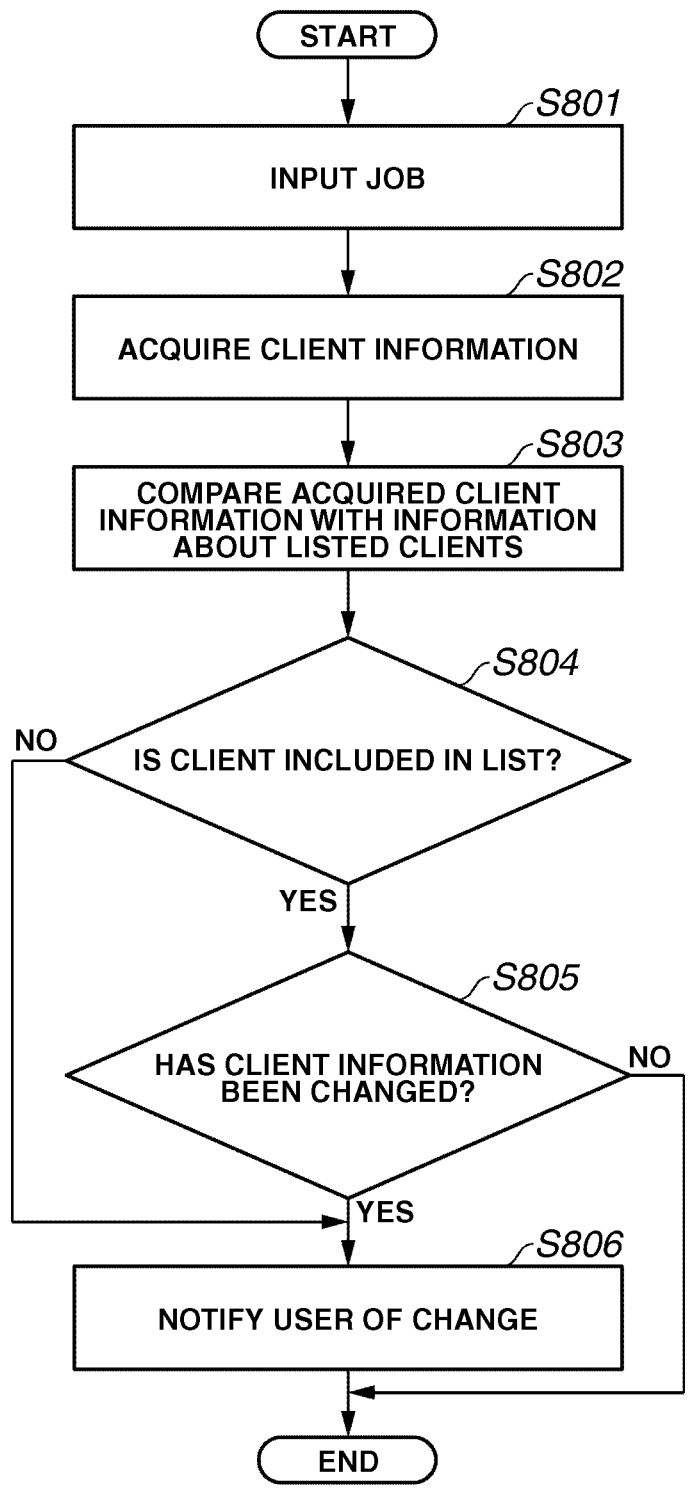
FIG. 8 is a flow chart illustrating an example of data processing performed by the printer device according to the first exemplary embodiment of the present invention.

FIG. 8 is a flow chart illustrating an example of data processing performed by the printer device 105 according to the present embodiment. The example of the processing flow in FIG. 8 illustrates the processing in step S703 (FIG. 7). According to the processing flow, before starting the instructed print job, it is determined whether the installation environment of the client has been changed and the user is notified of a result of determination. Each step of the flow chart can be implemented by reading and executing a control program stored on a ROM and loaded onto a RAM of a controller unit of the printer device 105 (FIG. 1), with the CPU of the controller unit.

Referring to FIG. 8, in step S801, the printer device 105 receives a print job from the PC 101 via the network 106. In step S802, the device information management unit 304 (FIG. 3) acquires the client information 410 (FIG. 4) about the PC 101 to which the user has input a print job from the print management unit 302 of the PC 101.

The processing in steps S801 and S802 is similar to the processing in steps S701 and S702 in FIG. 7. The subsequent processing in steps S803 through S806 correspond to the processing in step S703 in FIG. 7.

In step S803, the device information management unit 304 identifies the client via which the user has input the print job, based on the information included in the client information 410 acquired in step S802. At this time, the device information management unit 304 refers to the device name 601 to identify the client. In addition, the device information management unit 304 can refer to the detailed client information 610 also for the user name 602 and the IP address 603 to identify the client.

In step S804, the device information management unit 304 determines whether the client identified in step S803 is included in the client list 502.

If it is determined in step S804 that the client identified in step S803 is included in the client list 502 (YES in step S804), then the processing advances to step S805. On the other hand, if it is determined in step S804 that the client identified in step S803 is not included in the client list 502, then the processing advances to step S806.

In step S805, the detailed client information 610 about the client included in the client list 502 is compared with the previously stored client information 410 to determine whether the client information 610 has been changed.

If it is determined in step S805 that the client information 610 has been changed (YES in step S805), then the processing advances to step S806. Similarly, if no print request has been sent from the client after the environmental change flag 503 in the printer information 510 is set, the processing advances to step S806.

On the other hand, if it is determined in step S805 that the detailed client information 610 of a client has not been changed (NO in step S805), the processing ends.

In step S806, the device information management unit 304 of the printer device 105 notifies the print management unit 302 of the PC 101 that the latest installation environment of the client has been changed from a previous print job or that the print job has been sent from the client for a first time, and then the processing ends.

After the processing in step S806 is performed, the print management unit 302 of the PC 101 receives the above-described notification from the device information management unit 304 of the printer device 105.

Figure 9:
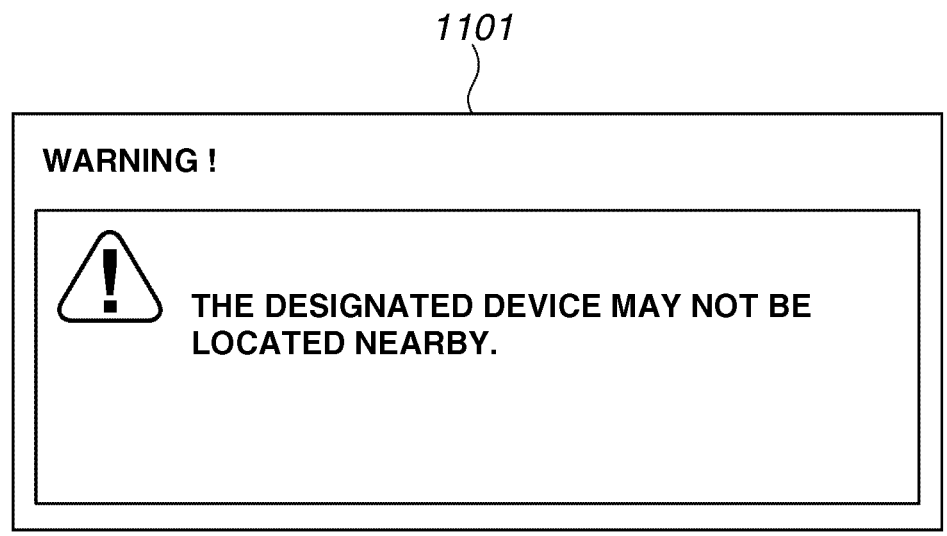
FIG. 9 illustrates an example of a dialog displayed on a display of the PC according to the first exemplary embodiment of the present invention.

Then, the PC 101 displays a warning message illustrated in FIG. 9 on a dialog window 1101 (FIG. 9) in the display unit 207 via the printer driver 301 to notify the user that the latest installation environment of the client has been changed from a previous print job or that the print job has been sent from the client for a first time.

That is, if the latest installation environment of the client has been changed from the previous print job or if no print job has been sent from the client so far, the client and the printer device 105 can be separated apart. Accordingly, the CPU of the controller unit notifies to the user that the client can be installed in a location distant from the printer device 105.

Alternatively, in the present embodiment, if it is determined that the installation location of the client has been changed from a previous print job, the device information management unit 304 acquires client information stored in another printer device (not illustrated) on the network 106 (a printer device having a configuration similar to the printer device 105).

Then, the device information management unit 304 compares the detailed client information 610 acquired from the another printer device with the client information 410 acquired at the time of receiving a print request.

Based on a result of the comparison, the device information management unit 304 extracts printer devices that store client information of the same client, or printer devices that are installed in a location close to the client included in the acquired client information, and generates a list of printer devices that can be selected by the user.

Then, the device information management unit 304 sends the generated list of selectable printer devices to the print request source computer.

When the user generates an instruction for deleting the client information from the PC 101 (the print request source apparatus), the device information management unit 304 deletes the client information 410 corresponding to the print request source apparatus (the PC 101) stored on the HDD 305.

Accordingly, if a user erroneously selects a printer device that the user has used before the installation location of the PC 101 was changed, the user can select another appropriate printer device. Furthermore, the previously used printer device is not required to continue storing the client information that has become unnecessary.

Figure 10:
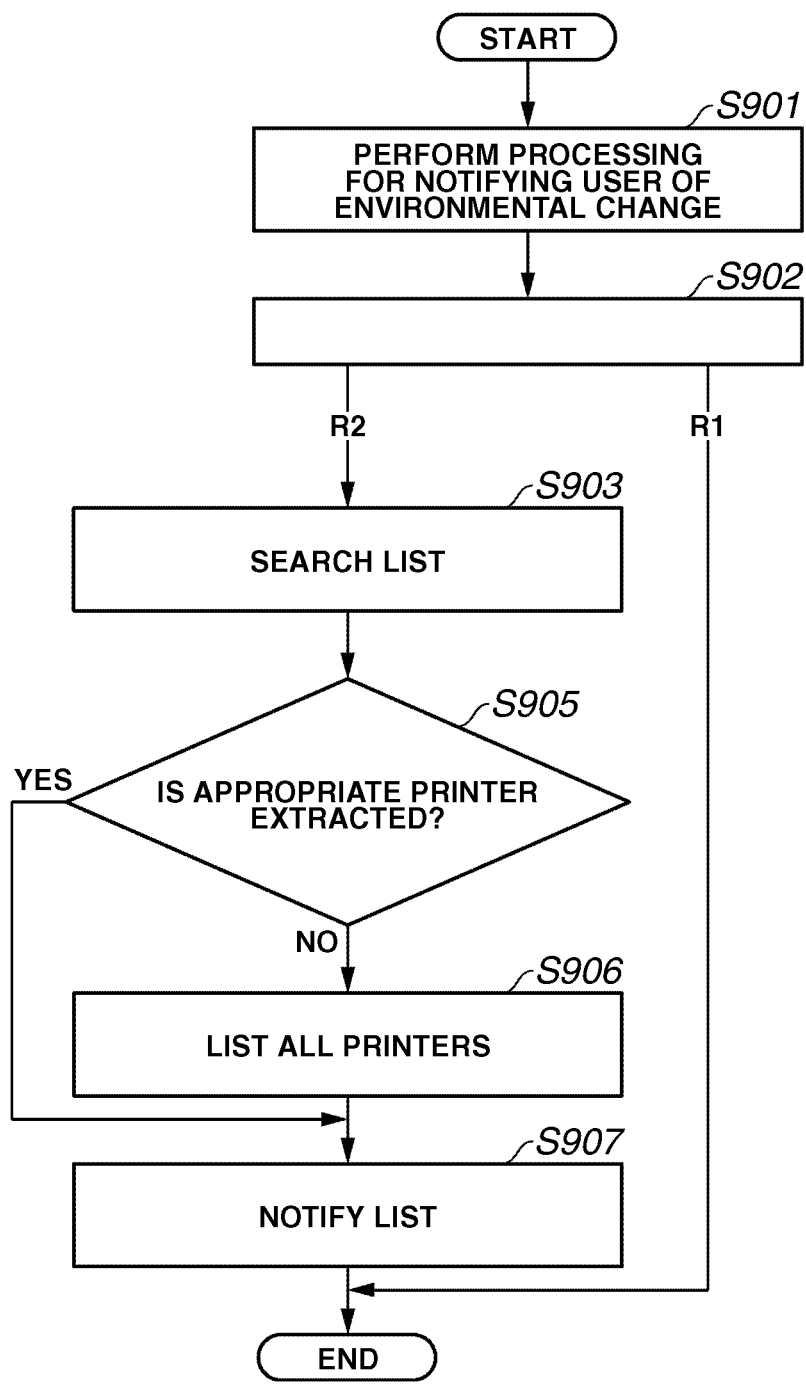
FIG. 10 is a flow chart illustrating an example of data processing performed by the printer device according to the first exemplary embodiment of the present invention.

FIG. 10 is a flow chart illustrating an example of data processing performed by the printer device 105 according to the present embodiment.

The processing in the flow chart of FIG. 10 is an example of processing for notifying a candidate printer device to a user in the case where the installation location of the PC 101 has been changed from a previous print job when the user selects a printer device 105 to perform a print job in the printing system illustrated in FIG. 1. Each step of the flow chart of FIG. 10 can be implemented by reading and executing a control program stored on a ROM and loaded onto a RAM of a controller unit of the printer device 105 (FIG. 1), with a CPU of the controller unit.

Referring to FIG. 10, when the device information management unit 304 of the printer device 105 completes the environmental change notification processing (step S806 in FIG. 8), the process advances to step S902. In step S902, the processing branches into two different processing depending on the user setting.

The processing to be performed is registered and stored on the printer device 105 on the RAM according to the user operation.

A first processing flow, processing flow R1 in FIG. 10, is performed in the case where, after the environmental change notification processing in step S806 in FIG. 8 is completed, the user generates an instruction for performing a print job under the changed print environment as it is. In this case, after the environmental change notification processing is completed, the processing ends.

Then, the printer device 105 receives the instruction for performing the print job in step S709 in FIG. 7, and performs the print job according to the received user instruction.

In the case of a second processing flow, processing flow R2 in FIG. 10, after the environmental change notification processing is completed, the processing advances to step S903. In step S903, the device information management unit 304 provides a list of other selectable printer devices to the user.

In this case, the user does not issue a print instruction to the printer device 105. That is, the user determines a substitute printer device, and then issues a print instruction to the selected printer device.

More specifically, if it is determined in step S902 that selection of the processing flow (route) R2 is registered on the RAM, then the processing advances from step S902 to step S903. In step S903, the device information management unit 304 of the printer device 105 makes inquiry to the device information management units 304 of plural printer devices on the network 106. Then, the device information management unit 304 searches for a printer device from among those included in the client lists 502 of the plural printer devices.

The condition for searching for a printer device can include various conditions. For example, a printer device installed in a location close to the current location of the PC 101 can be searched using the installation location information 404 in the client information 410 and the installation location information 605 in the detailed client information 610. Alternatively, a printer device can be searched that stores the client list 502 including the client via which the user has generated the instruction for performing the print job. Furthermore, a printer device can be searched that stores the same client information as the information acquired from the printer device 105.

In step S905, the device information management unit 304 determines whether an applicable printer device that satisfies the above-described condition has been found as a result of the search in step S903.

If it is determined in step S905 that no printer device that satisfies the above-described condition has been found as a result of the search, then the processing advances to step S906. In step S906, the device information management unit 304 generates a list of all candidate printer devices.

Thus, the user can select a desirable printer device from among all the printer devices on the network 106.

In displaying the candidate printer devices to the user, the device information management unit 304 displays the installation location information 605 included in the detailed client information 610 at the same time.

In step S907, the device information management unit 304 of the printer device 105 sends the list generated as a result of the search in steps S905 and S906 to the print management unit 302 of the PC 101. Then, the processing ends.

Subsequently, the user selects a printer device and performs the print job with the selected printer device. Accordingly, if a user erroneously selects a printer device that the user used before the installation location of the PC 101 was changed, the user can select another appropriate printer device.

Figure 11:
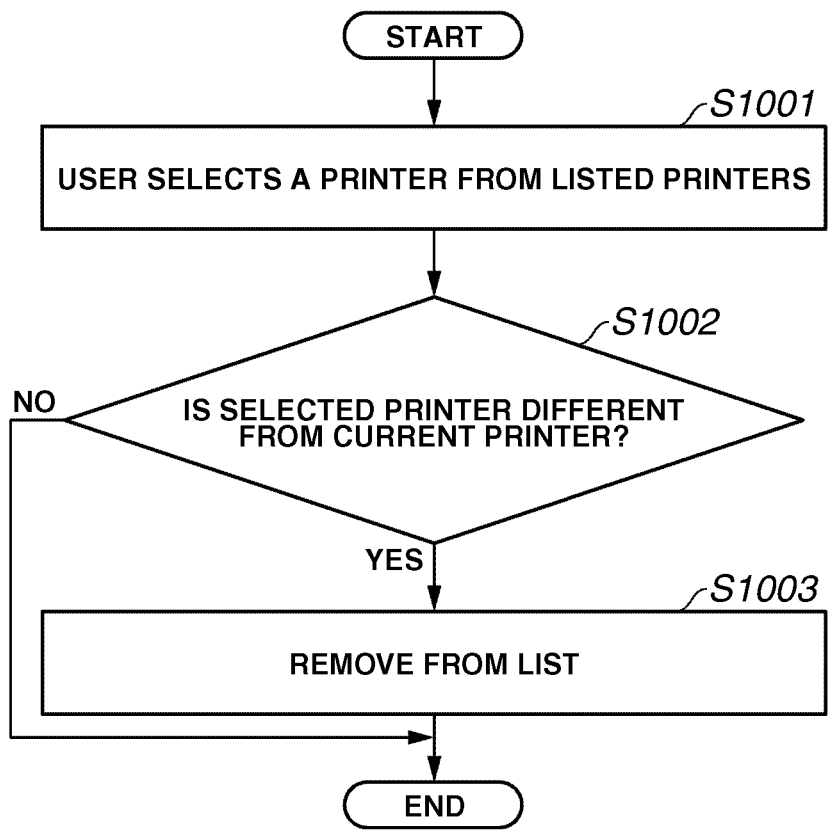
FIG. 11 is a flow chart illustrating an example of data processing performed by the PC according to the first exemplary embodiment of the present invention.

FIG. 11 is a flow chart illustrating an example of data processing performed by the PC (client) according to the present embodiment.

The processing flow of FIG. 11 illustrates as an example how the client list 502 is dealt with when the PC 101 (FIG. 1) notifies the list of substitute printers to the user. Each step of the flow chart of FIG. 11 can be implemented by reading and executing a control program stored on the ROM 201 or the HDD 205 and loaded onto the RAM 202 of the PC 101 (FIG. 1), with the CPU 200 (FIG. 2).

Referring to FIG. 11, in step S1001, the CPU 200 displays the list of printer devices sent from the device information management unit 304 of the printer device 105 in step S907 (FIG. 10) to allow the user to select a printer device from among the printer devices included in the list.

In step S1002, the CPU 200 determines whether the printer device selected by the user in step S1001 is the same as the currently operated printer device (i.e., the printer device to which the print job is input in step S701 or step S801).

If it is determined in step S1002 that the printer device selected by the user from among the listed printer devices is different from the printer device with which the user has originally attempted to perform the print job (YES in step S1002), then process advances to step S1003.

On the other hand, if it is determined in step S1002 the printer device selected by the user from among the listed printer devices is the same as the printer device with which the user has originally attempted to perform the print job (NO in step S1002), the processing ends.

In step S1003, the CPU 200 generates an instruction for deleting the information about the client from the client list 502 stored in the device information management unit 304 of the printer device 105. Then, the processing ends.

Thus, the printer device used before the change of the installation location of the PC 101, is not required to continue storing the client information that has become unnecessary.

In the present embodiment, in the case where the installation location information 605 included in the detailed client information 610 which is acquired from the print request source apparatus (the PC 101), is different from the previously stored installation location information 404 included in the client information 410 about the PC 101, a warning message is displayed on the display unit 207 of the PC 101.

The installation location of the printer device 105 can be changed from the time the printer device 105 received a previous print request from the same PC 101. In this case, it is useful to replace the installation location information 404 and 605 of the PC 101 described above with installation location information about the printer device and thus, a similar effect can be achieved.

That is, when the user generates an instruction for performing a print job via the PC 101, the device information management unit 304 of the printer device 105 stores the current printer information associating with the client information. Then, when the user generates another print request a next time, the device information management unit 304 determines whether the current printer information is different from the installation location information included in the previously stored printer information. If it is determined that the current installation location information is different from the previously stored printer information, then the device information management unit 304 displays the warning message (FIG. 9) so that the user can recognize the change in the print environment.

Now, a second exemplary embodiment of the present invention will be described. In the above-described first exemplary embodiment, when the printer device 105 receives a print request from the PC 101, the printer device 105 determines whether the installation location of the PC 101 has been changed. If the installation location has been changed, the printer device 105 notifies the user that the positional relationship between the PC 101 and the selected printer device has been changed from a previous print job.

However, in the present exemplary embodiment, the processing performed by the printer device 105 in the above described first exemplary embodiment is performed by the PC 101.

When the user generates a print request for performing a print job with the selected printer device, the PC 101 acquires the printer information from the selected printer device and stores the acquired printer information. Then, when the user generates another print request a next time, the CPU 200 of the PC 101 determines whether the current printer information is different from the installation location information included in the previously stored printer information. If it is determined that the installation location information included in the printer information is different from the previously stored printer information, then the CPU 200 of the PC 101 displays the warning message (FIG. 9) on the display unit 207 so that the user can recognize the change in the print environment.

In addition, the PC 101 stores the client information about the PC 101 together with the printer information about the printer device which the user has selected as the printer device that performs a print job. Then, the CPU 200 of the PC 101 determines whether the current client information is different from the installation location information about the PC 101 included in the previously stored client information. If it is determined that the installation location information about the PC 101 is different from the previously stored client information, then the CPU 200 of the PC 101 displays the warning message (FIG. 9) on the display unit 207 so that the user can recognize the change in the print environment.

With the above-described configuration, the PC 101 can perform the processing described in the first embodiment.

Further, it can be determined that it is inappropriate to perform the print job instructed by the user with the printer device designated by the user. The determination is made based on the various causes related to the installation environment of the PC 101 and the printer device 105 except the actual physical distance between the PC 101 and the printer device 105.

For example, if the printer device 105 is installed in a location where the user of the PC 101 does not have entrance permission, it can be determined that it is inappropriate to perform the print job with the printer device designated by the user. That is, such information about a state of the installation location can be used as the condition for searching for an appropriate printer device instead of the actual installation location.

With the above-described configuration, the user can select an appropriate printer device to perform a print job even in the case where the installation location of the client or the printer device 105 has been changed.

Hereinbelow, a data processing program that can be read by either of the apparatuses in the printing system according to the above-described embodiments is described with reference to memory maps illustrated in FIGS. 12 and 13.

Figure 12:
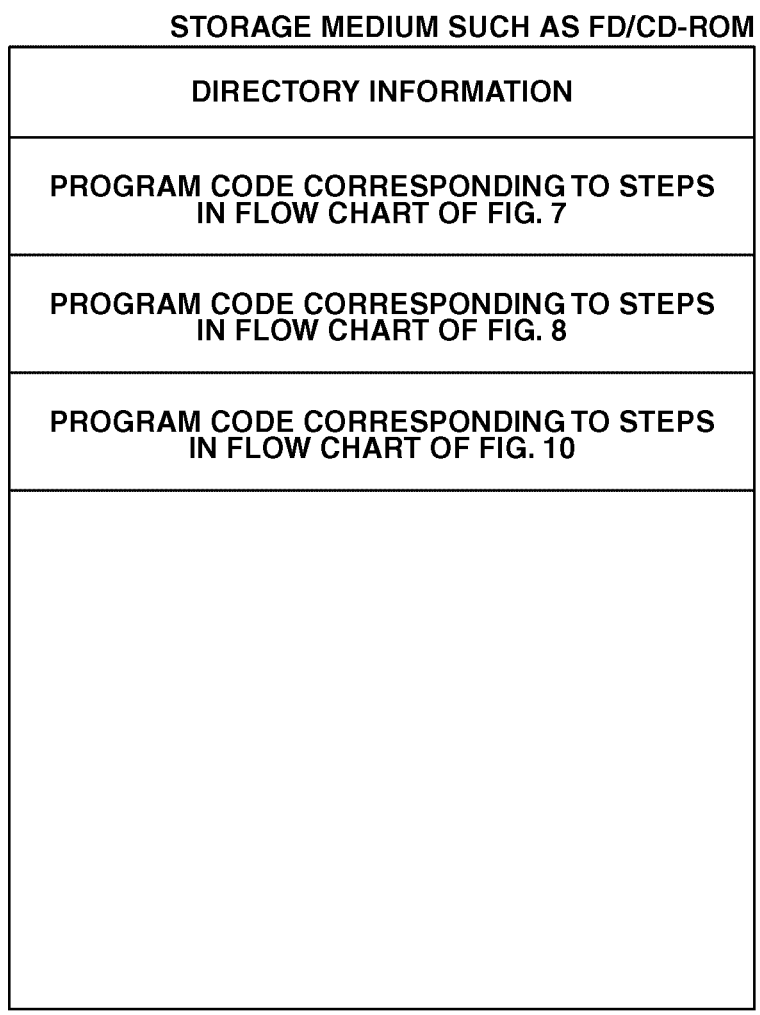
FIG. 12 illustrates a memory map of a storage medium that stores various data processing programs that can be read by a central processing unit (CPU) of the printer device according to an exemplary embodiment of the present invention.

FIG. 12 illustrates a memory map of a storage medium that stores various data processing programs that can be read by the printer device 105 in the printing system according to an exemplary embodiment of the present invention.

Figure 13:
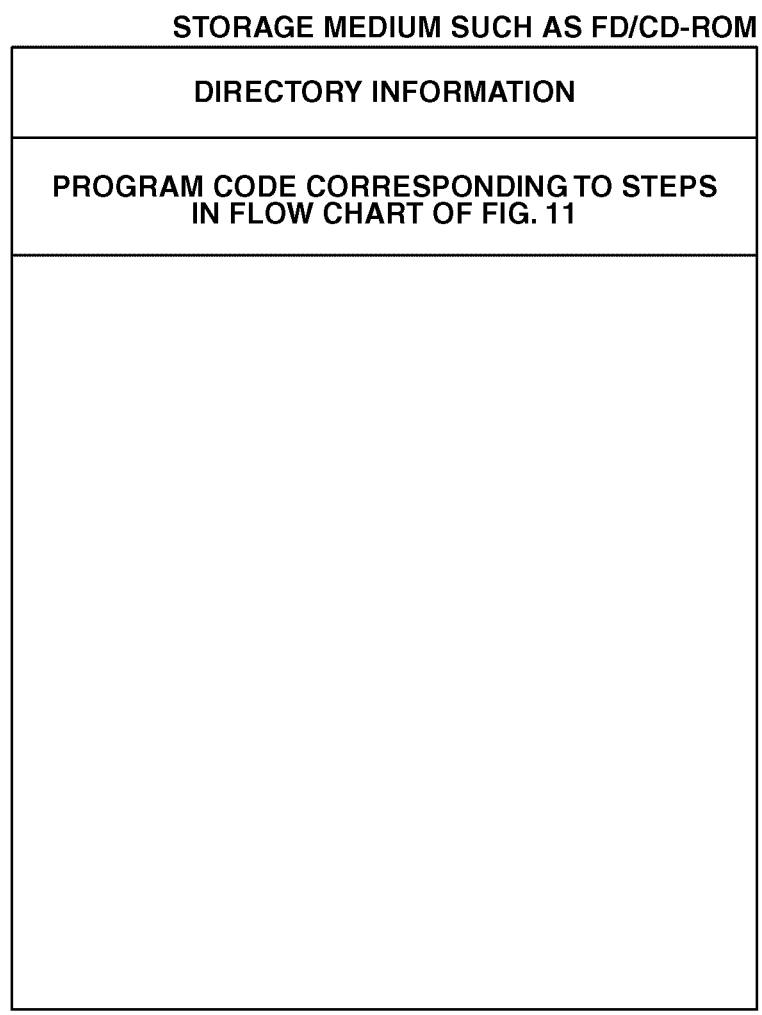
FIG. 13 illustrates a memory map of a storage medium that stores various data processing programs that can be read by the computer according to an exemplary embodiment of the present invention.

FIG. 13 illustrates a memory map of a storage medium that stores various data processing programs that can be read by the PCs 101, 102, 103, and 104 in the printing system according to an exemplary embodiment of the present invention.

Although not illustrated in FIGS. 12 and 13, information for managing the programs stored in the storage medium such as version information and information concerning the creator of a program, for example, can be stored in the storage medium. In addition, information that depends on an OS of an apparatus which reads the program, such as an icon for identifying and displaying the program, can also be stored in the storage medium.

In addition, data that is used in the various programs is also managed in a directory of the storage medium. Further, a program for installing the various programs on a computer can be stored in the storage medium. Furthermore, in the case where a program to be installed is compressed, a program for decompressing the compressed program can be stored in the storage medium.

Moreover, the functions according to the above-described embodiments illustrated in FIG. 7, FIG. 8, FIG. 10, and FIG. 11 can be implemented by a host computer using a program that is externally installed. In this case, the present invention can be applied when a group of information including the program is supplied to an output device from a storage medium such as a CD-ROM, a flash memory, and an FD or from an external storage medium through a network.

The present invention can also be achieved by providing a system or an apparatus with a storage medium storing program code of software which implements the functions of the embodiments of the present invention, and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disk, a magneto-optical disk, a magneto-optic disk (MO), a CD-ROM, a CD-R, a CD-RW, a magnetic tape, a nonvolatile memory card, a ROM, and a DVD (a DVD-R, DVD-ROM, and a DVD-RW), for example, can be used.

In this case, the program code itself, which is read from the storage medium, implements the function of the embodiments as described above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk. The functions of the above embodiments can also be implemented by dividing the program code into a plurality of files and downloading each divided file from different web sites. That is, a WWW server and a file transfer protocol (FTP) server for allowing a plurality of users to download the program file for implementing the functional processing constitutes the present invention.

In addition, the above program can also be supplied by distributing a storage medium such as a CD-ROM and the like which stores the program according to the present invention after an encryption thereof; by allowing the user who satisfies a prescribed condition to download key information for decoding the encryption from the web site via the Internet; and by executing and installing in the computer the encrypted program code using the key information.

Further, the functions according to the embodiments described above can be implemented not only by executing the program code read by the computer, but also by the processing in which an OS or the like carries out a part of or the whole of the actual processing based on an instruction given by the program code.

Furthermore, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

According to the above-described embodiments of the present invention, it can be notified to the user that the user is generating an instruction for performing a print job with a printer device that is installed in a location that the user does not keep in mind.

That is, in the case where a print environment of a printer or a client PC has been changed from a previous print job, even if the user attempts to perform a print job with a printer device in a changed environment, the user can surely recognize that the print environment has been changed.

According to the above-described embodiments, a print product can be prevented from being output in an unintended location. Thus, the user convenience and the data security can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-344393 filed Dec. 21, 2006, which is hereby incorporated by reference herein in its entirety.

What is claimed is:

1. A printing apparatus comprising:
   a receiving unit configured to receive, from a data processing apparatus, a print request and location information regarding a current location of the data processing apparatus;
   a storage unit configured to store location information regarding a previously known location of the data processing apparatus;
   a comparison unit configured to compare the location information received by the receiving unit to the location information stored in the storage unit;
   a determination unit configured to determine whether the current location indicated by the location information received by the receiving unit is different from the previously known location indicated by location information stored in the storage unit based on comparison by the comparison unit; and
   a notification unit configured to notify the data processing apparatus of information regarding a location of the printing apparatus, if it is determined by the determination unit that the current location indicated by location information received by the receiving unit is different from the previously known location indicated by location information stored in the storage unit.

2. The printing apparatus according to claim 1, further comprising:
   an acquisition unit configured to acquire the location information from other data processing apparatuses;
   a list generation unit configured to generate a list of printing apparatuses based on the acquired location information; and
   a transmission unit configured to transmit the list generated by the list generation unit to the data processing apparatus.

3. The printing apparatus according to claim 1, further comprising a deletion unit configured to delete stored location information regarding a location of the data processing apparatus if it is determined by the determination unit that the location information received by the receiving unit is different from the location information of the previously known location of the data processing apparatus stored in the storage unit.

4. The printing apparatus according to claim 1, wherein the information notified by the notification unit indicates that the location of the printing apparatus is distant from a location of the data processing apparatus.

5. A method for controlling a printing apparatus, the method comprising:
   receiving, from a data processing apparatus, a print request and location information regarding a current location of the data processing apparatus;
   storing location information regarding a previously known location of the data processing apparatus;
   comparing the received location information to the stored location information;
   determining whether the current location indicated by the received location information is different from the previously known location indicated by the stored location information based on the comparing; and
   notifying the data processing apparatus of information regarding a location of the printing apparatus, if it is determined that the current location indicated by the received location information is different from the previously known location indicated by the stored location information.

6. A non-transitory computer-readable storage medium for storing a computer-executable program for causing a printing apparatus to perform the method of claim 5.

* * * * *